(12) United States Patent
Mian et al.

(10) Patent No.: US 8,079,274 B2
(45) Date of Patent: Dec. 20, 2011

(54) ROTATIONAL COMPONENT TORQUE MEASUREMENT AND MONITORING SYSTEM

(75) Inventors: Zahid Mian, Loudonville, NY (US); William Peabody, Saratoga Springs, NY (US); Sheppard Salon, Schenectady, NY (US)

(73) Assignee: IEM Corp., Troy, NY (US)

( * ) Notice: Subject to any disclaimer, the term of this patent is extended or adjusted under 35 U.S.C. 154(b) by 191 days.

(21) Appl. No.: 12/453,749

(22) Filed: May 21, 2009

(65) Prior Publication Data
US 2010/0031756 A1    Feb. 11, 2010

Related U.S. Application Data

(60) Provisional application No. 61/071,862, filed on May 22, 2008.

(51) Int. Cl.
    *G01L 3/02* (2006.01)
(52) U.S. Cl. .............. 73/862.335; 73/862.333
(58) Field of Classification Search ....... 73/862.331–862.335
    See application file for complete search history.

(56) References Cited

U.S. PATENT DOCUMENTS

| | | | | |
|---|---|---|---|---|
| 4,453,420 A * | 6/1984 | Nakane et al. | ........... | 73/862.326 |
| 4,627,298 A * | 12/1986 | Sahashi et al. | ........... | 73/862.336 |
| 4,789,826 A * | 12/1988 | Willett | ........... | 324/207.2 |
| 4,989,460 A * | 2/1991 | Mizuno et al. | ........... | 73/862.335 |
| 6,810,336 B2 * | 10/2004 | Nakane et al. | ........... | 702/43 |
| 6,851,324 B2 * | 2/2005 | Islam et al. | ........... | 73/862.328 |

\* cited by examiner

*Primary Examiner* — Max Noori

(57) ABSTRACT

A system and method for measuring torque on a rotating component, comprising of signal-producing components which are applied to the rotating component, and a means for obtaining the signals produced by said signal producing components, in which at least two signal producing components are applied to the rotating component with some linear separation between the two signal producing components and their corresponding devices for obtaining signals produced, such that torque applied to the rotating component will cause a change in phase between the signals received from each of the signal-producing components and thus permit the measurement of torque based on this change in phase; one embodiment of this invention comprising two magnetic rings, one at either end of a driveshaft, with sensor coils placed near to each magnetic ring such that an alternating electrical current is produced, the comparative phase between these currents permitting measurement of torque on the driveshaft.

18 Claims, 6 Drawing Sheets

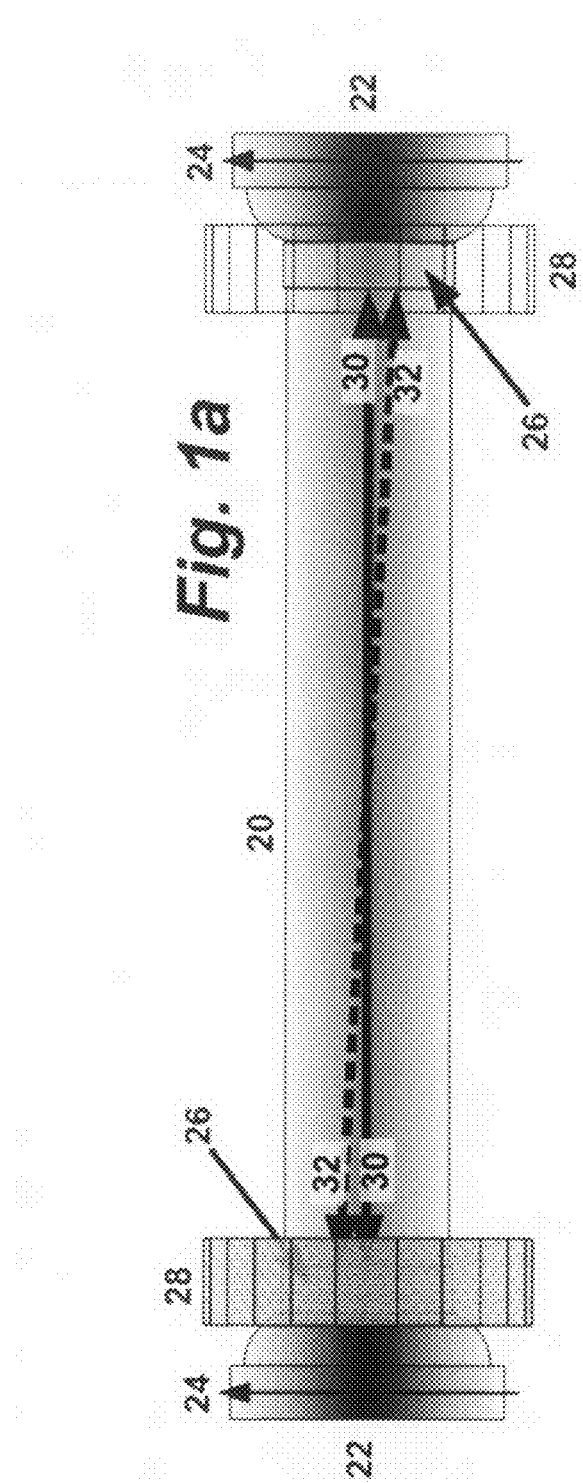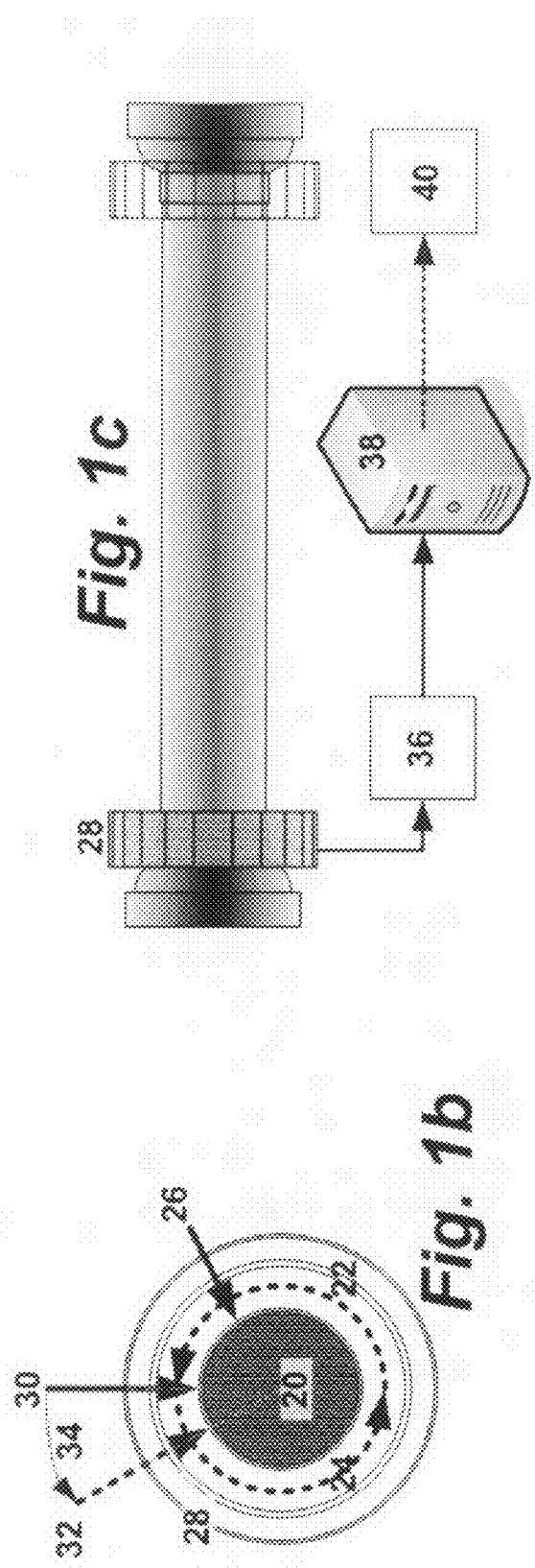

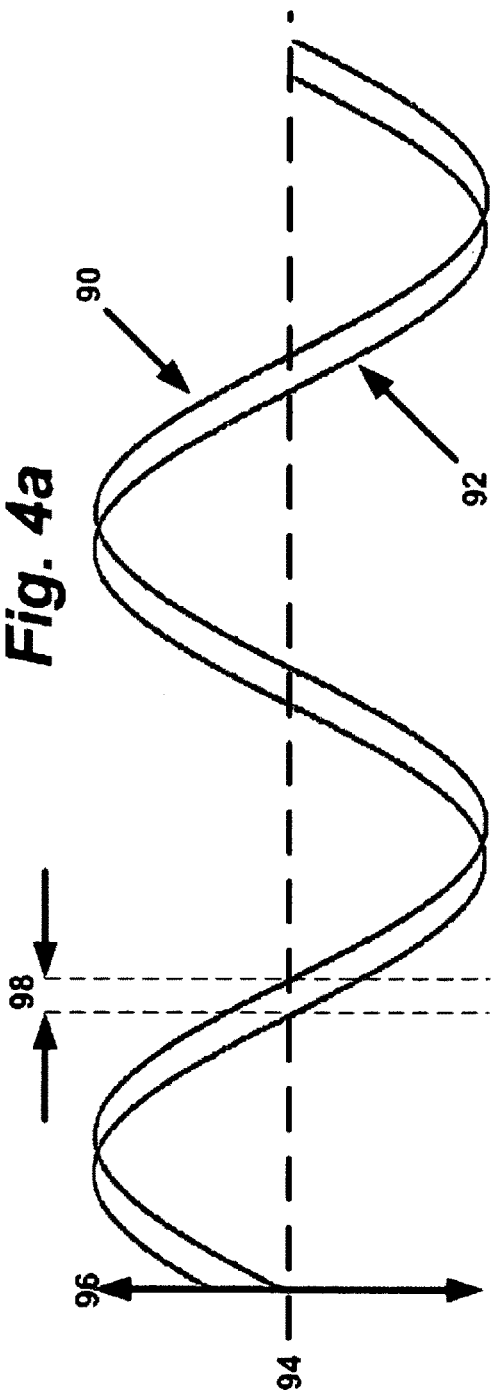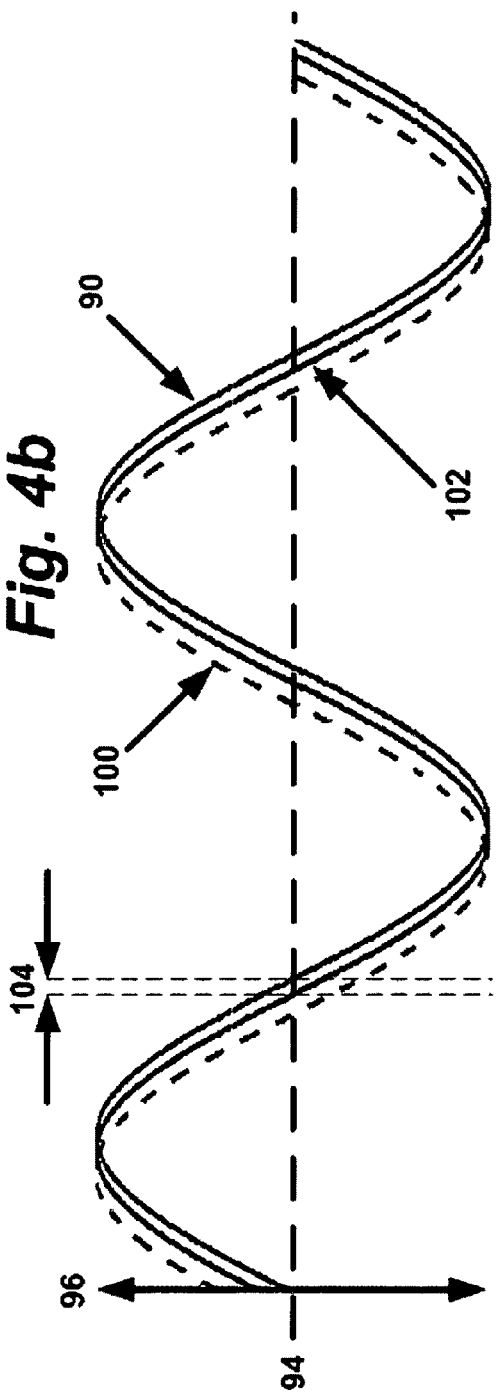

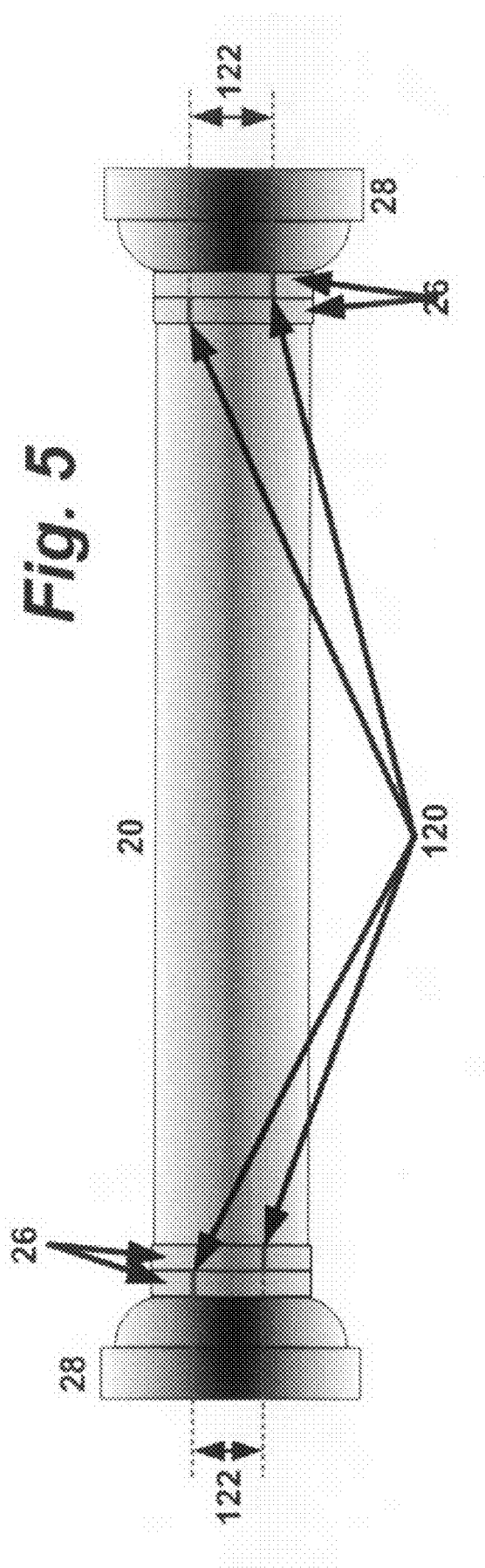

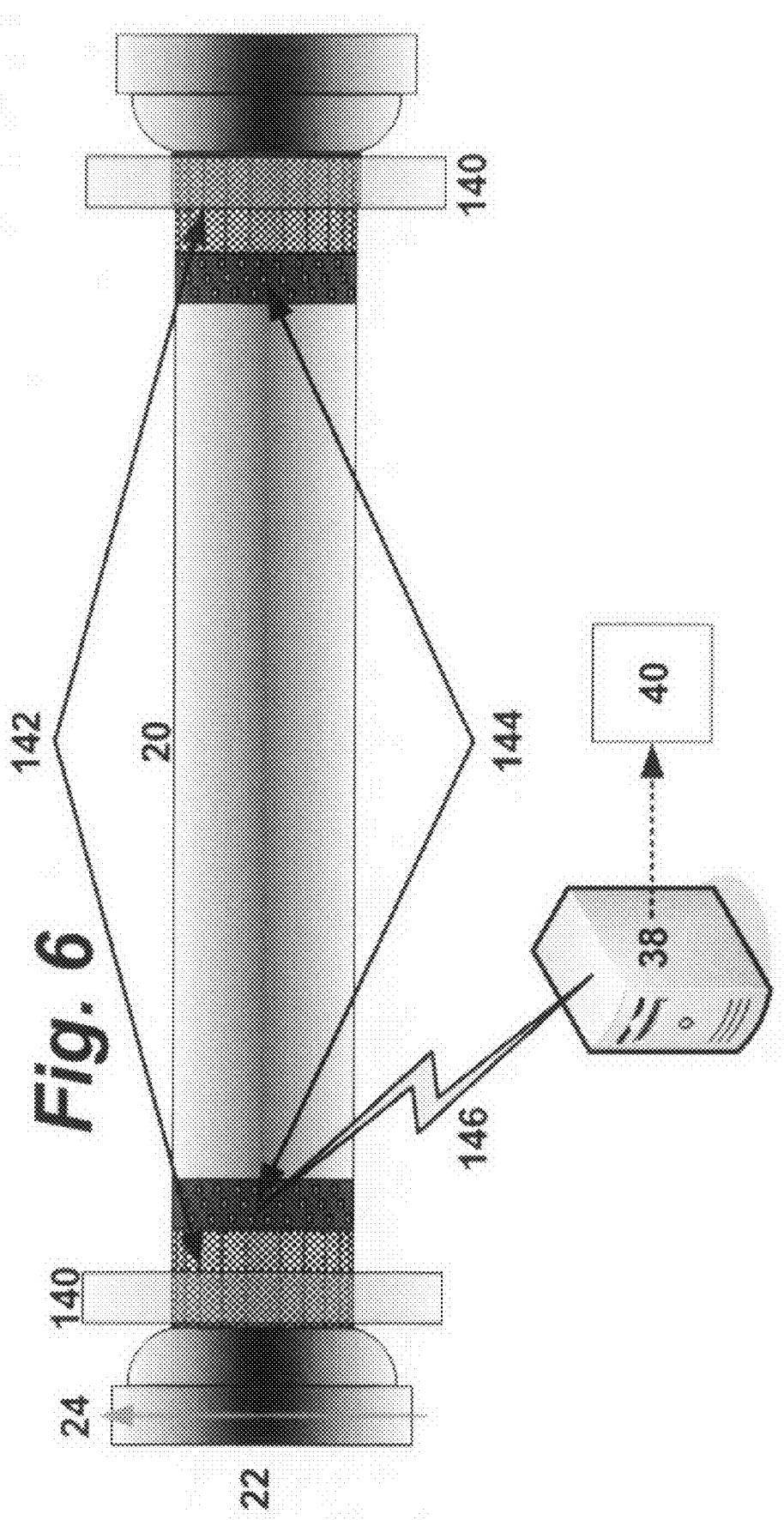

ROTATIONAL COMPONENT TORQUE MEASUREMENT AND MONITORING SYSTEM

REFERENCE TO PRIOR APPLICATIONS

The current application claims the benefit of U.S. Provisional Application No. 61/071,862, titled "Rotational Component Torque Measurement and Monitoring System", which was filed on 22 May 2008, and which is hereby incorporated by reference.

GOVERNMENT LICENSE RIGHTS

The U.S. Government has a paid-up license in this invention and the right in limited circumstances to require the patent owner to license others on reasonable terms as provided for by the terms of Contract W911W6-05-C-0008 awarded by the United States Army.

TECHNICAL FIELD

The disclosure relates generally to monitoring systems, and more particularly, to a new and improved method for measuring torque.

BACKGROUND ART

Measurement of torque and related parameters are extremely important capabilities in a number of transportation and industrial applications. Measuring the torque or strain on a mechanical element such as a drive shaft can be used in HUMS (Health and Usage Monitoring Systems) to determine the used and available lifetime of the component, and in real-time use may be used to warn the operator of the vehicle or equipment that they are approaching some limit of operation.

The basic methods available to measure or monitor torque typically center around use of a strain gage element(s) with a required power supply/signal connections and strategic gage placement opportunity on the target member or serially loaded component elements. All though useful in many instances, there are inherent limitations and applications challenges. Surface preparation and adherence methods for use of traditional strain gages sometimes alter or constrain the part or its assembled version. These sensors tend to be fragile devices that can be over stressed with a hysteresis affect causing a permanent shift to the strain gage characteristics affecting calibration values or can result in complete device failure. Such components must also be bound to the component to be monitored in a manner which effectively unites the gauge with the component as a single unit, so that the strain experienced by the component is directly and fully transferred to the gauge.

When the component to be monitored is a rotating device, other hurdles are added. Required performance often entails successful coupling of the power from the outside instrumentation amps to the target component and the retrieval of signal data generated on the part while not adversely altering its functional use. Slip rings were the early principal method of implementation in such cases. That method has susceptibilities to vibration, contact wear, contamination and heat generation from contact friction.

To address some of the slip ring vulnerability issues, a wireless variant of such devices, often utilizing transformer coupling of power and signal from the housing to the shaft, still share some of the burdens of its near cousin using slip rings: Physical limitation to tolerated movement of monitored element to the surrounding housing/coupling mechanics of the slip ring/sensor pickup assembly; and the use of bearings to support assemblies around the shaftlike element substituted for a length of the original part to be monitored. These devices have a large space allocation requirement and add to frictional losses along with rotational speed limit specifications that can constrain its application.

Optical type systems tend to be expensive and not tolerant to optical contamination from the many possible sources including normal environmental dust particles; dirt may obscure the markings, objects, or emitters used by the sensor, or it may cover/degrade the performance of the sensing elements themselves. These methods cannot be used where oils or others commonplace contaminants would obscure the optical performance.

Use of newer technologies, such as magnetic signature modeling and magnetic strain detection, require substitution of prime components with parts constructed of exotic materials and extensive instrumentation. The negative impact for the user can be dramatic: new processes, significant engineering time for design and calculations, potential certification issues and practical use limitations of material characteristics to perform the intended task are some of the most significant issues. These become even more significant when the component in question is part of an established system and manufacturing process; any change to, for example, the established design of components of a widely-used vehicle impacts the physical manufacturing and also the vehicle safety and certification areas of the industry.

Attempts have been made to mitigate the above issues by using rings or sensing components attached to the original component. This has the advantage of not requiring the entire manufacturing process to be changed, but still requires permanent physical modification of the component, as in order to register the changes in stress the rings or sensing components must be rigidly and effectively immovably bonded to the original component.

In addition, measurement of a magnetic field as a noncontact method tends to be limited by most methods to very small "lift-off" levels—small fractions of an inch. In many cases a shaft to be instrumented may require ¼" or greater clearance around it due to movement in use, and this is much greater than the practical ranges for many such magnetic measurement-based devices.

The presented invention offers a new and innovative means of measuring torque with no physical connections to the measured component, no direct modification of the measured component, significant liftoff (greater than ¼"), and wireless, accurate acquisition of the data with no moving components in the system except for the shaft itself. The invention may also be applied to other stressed objects which move during the intervals in which stress or torque would be measured.

SUMMARY OF THE INVENTION

The need to monitor the applied torque and the resulting strain for many applications is important for performance, structural and safety reasons. This is particularly difficult when it is in relation to rotating equipment components in challenging environments. Many incumbent technologies exist that partially fulfill monitoring capabilities but fail to bridge the gap in some of the most critical applications.

Non-contact measurement is often required where optical or other established methods have significant limitations. In some situations there can be axial and non concentric radial movement of the rotating member relative to the surrounding housing or sensor assemblies. A robust characterization method that is tolerant to relative movement and has minimum interference clearance that can be attached to high speed rotating parts with negligible impact to dynamic balance of the rotating members is lacking in current product offerings in the market place.

This invention, Rotational Component Torque Measurement and Monitoring System, offers improvement in capability and results to measure torque and related parameters such as strain for a wide array of common place and exotic applications where existing solutions have limited success.

Aspects of the invention provide an improved system and method for measuring torque in any system incorporating some form of shaft or connecting component subjected to torque. The invention comprises of a set of magnetic rings, a set of sensing coils, electronics which may receive, amplify, filter, or condition the signal generated by the coils during use of the invention, and computing software and hardware which may receive the signals from the electronics and store, analyze, and/or evaluate them to determine torque in a system.

A first aspect of the invention is a system for torque measurement, comprised of a set of rings with a known spacing of magnetic poles about their circumference, a corresponding set of sensing coils whose size and spacing correspond in angular spacing to the magnetic poles of the rings, electronics for acquiring, amplifying, and filtering the signals from the coils, software to analyze these signals and determine a torque therefrom, and a computing device capable of supporting this software and performing other storage and retrieval tasks.

A second aspect of the invention is a method for torque measurement, comprising of: waveform signals being generated in the sensing coils by the rotation of the magnetic rings affixed to the component undergoing torque, determining a phase of the signals from the ring-coil pairs, comparing the phase of the signals to determine any difference from that which exists when the component is not undergoing torque, and determining a torque from this phase difference.

The illustrative aspects of the invention are designed to solve one or more of the problems herein described and/or one or more other problems not discussed.

BRIEF DESCRIPTION OF THE DRAWINGS

These and other features of this invention will be more readily understood from the following detailed description of the various aspects of the invention taken in conjunction with the accompanying drawings in which:

FIG. 1 shows an illustrative view of the invention in basic concept, according to one embodiment of the invention, including the basic concept of measurement of torque by the invention and the invention as part of a system.

It is noted that the drawings of the invention are not to scale. The drawings are intended to depict only typical aspects of the invention, and therefore should not be considered as limiting the scope of the invention. In the drawings, like numbering represents like elements between the drawings.

FIG. 4 illustrates the basic principle of torque measurement through phase differences.

FIG. 5 shows an illustrative method of using multiple magnetic rings.

FIG. 6 illustrates an alternative embodiment in which the sensing coils are affixed to the rotating shaft and the magnet rings are attached to the surrounding support structure.

DETAILED DESCRIPTION OF THE INVENTION

Figure 2:
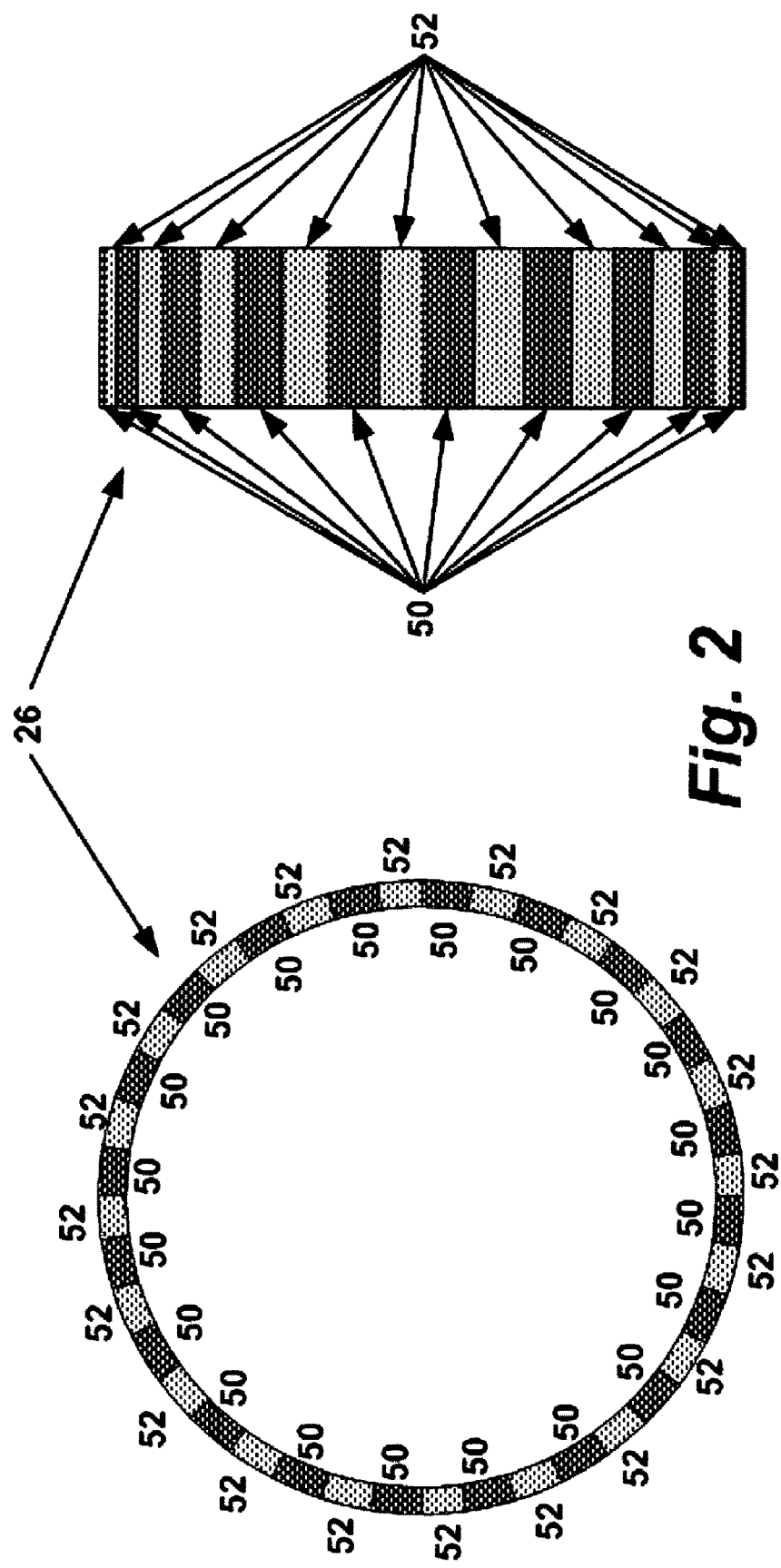
FIG. 2 shows a conceptual diagram of an example of a magnetic ring.
Figure 3:
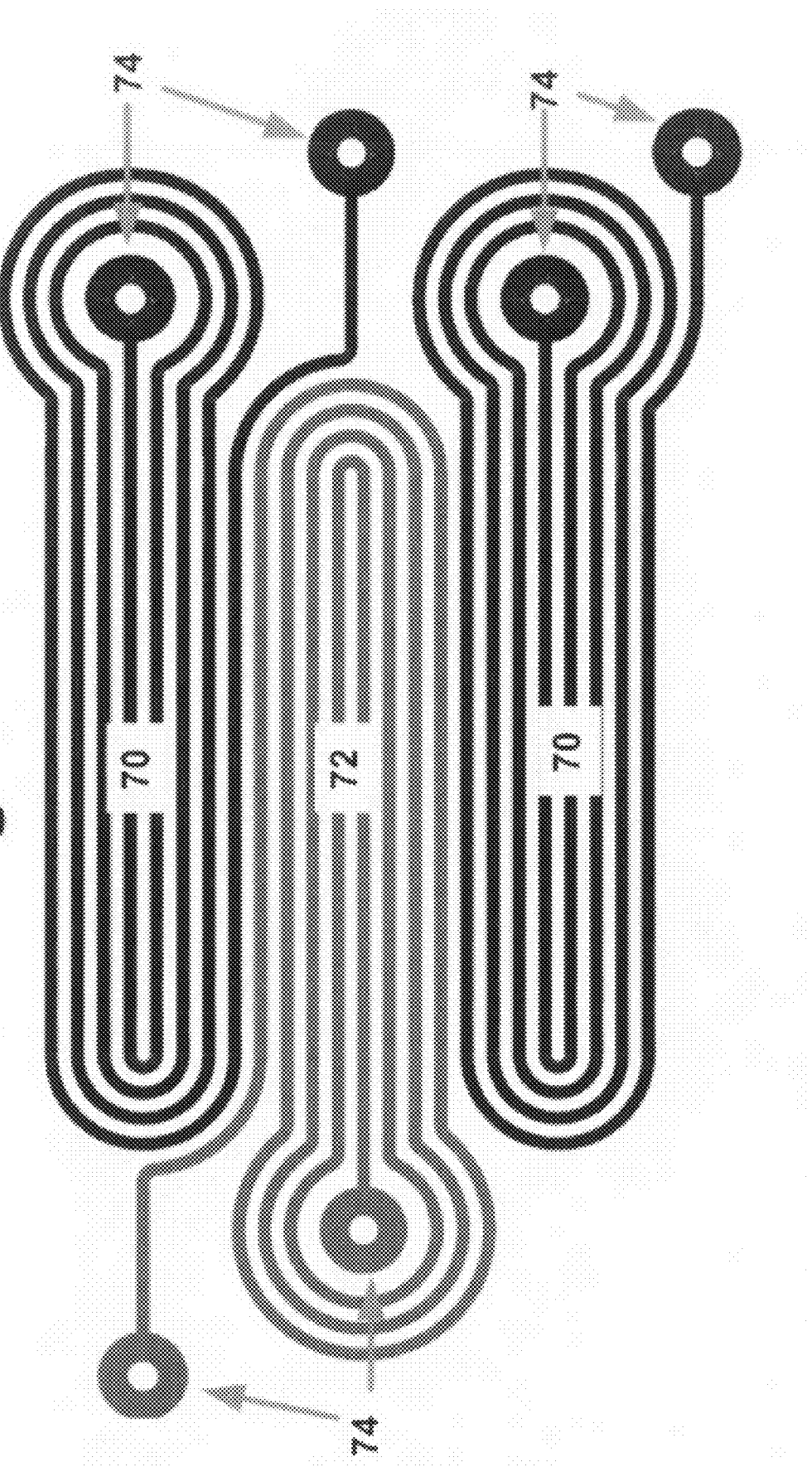
FIG. 3 shows an example of sensing coil design appropriate to the invention.

Torque, to describe it in simple terms, is twisting force. We exert torque on a bolt when we use a wrench to tighten it. Most vehicles have to translate straightforward motion to rotational motion, transmitting torque through the system via driveshafts.

The preferred embodiment of the invention presented is intended to measure torque on a drive shaft or a segment of a drive shaft; such shafts are found in diverse settings ranging from fixed-mount motors and engines used in manufacturing to the driveshafts of vehicles including (but not limited to) cars, trucks, and rotorcraft. In simple form, the invention is diagrammed in FIG. 1.

FIG. 1a shows a side view of the system, while FIG. 1b shows an end-on view of the system. In FIG. 1, we see a shaft 20 held or supported by two end components 22, which rotates in direction 24. At each end of the shaft 20 is placed a magnetic ring 26 (described in more detail later). Around the area where the magnetic rings 26 are emplaced are sets of sensors 28. While the sensors 28 are shown to be in a full circular configuration, it should be understood that in many embodiments the sensors may only cover a small arc, or a set of small arcs, around the perimeter.

In any event, when the shaft 20 is rotating evenly, the shaft 20 remains straight and a line 30 drawn from one point on one of the rings 26 to the corresponding point on the other ring 26 is a straight line parallel to the axis of the shaft. However, when the shaft 20 is placed under load, the shaft 20 will twist (of necessity, as no material is perfectly rigid, all materials will deform under load). This means that the corresponding points on the rings 26 are now offset by some amount as shown by line 32. Viewed end-on as seen in FIG. 1b, the difference between the non-loaded and loaded shaft corresponding locations forms an angle 34. Given the specific dimensions and material making up the shaft 20, it can be shown that the angle of twist 34 is directly proportional to the torque in the shaft (for most materials). Thus, a methodology for determining this angle of twist will of necessity permit the measurement of torque.

FIG. 1c shows the invention as an overall system. The sensors 28 produce signals which may be sent to electronics 36; these electronics may comprise filters (bandpass, low or high pass, etc.) for the reduction of noise and enhancement of signal or other purposes, amplifiers for the signals received, microprocessors for immediate analysis of data, averaging over some numbers of samples, or other applications, analog-to-digital conversion components, and others. In any event, the electronics 36 may pass their data to a data-processing subsystem 38 which may store the data, retrieve the data, perform analyses upon the data (for example, determining if a limit threshold has been met, performing a fatigue rainflow analysis, or others), or may transmit the data and/or analytical results, send an alert or action message, or otherwise interact with some other system or device 40. For example, if the invention were installed in a vehicle to measure torque and detected torque beyond safe limits, the data processing subsystem 38 might send a safety warning to the driver or pilot of the vehicle, the warning system being the system or device 40 in this case.

FIG. 2 shows the makeup of the magnetic rings 26. These rings are made up of some number of alternating north poles 50 and south poles 52 on their outer diameter, though these poles are generally not visible to the unaided eye. The number of these poles may be varied as needed for a particular application, and depends on the sensitivity of the sensors, the accuracy in reading desired, and some physical limitations. FIG. 2 shows a ring with a total of 40 poles (twenty north poles 50 and twenty south poles 52) but the actual number used will vary and nothing in this patent should be construed to limit increasing or decreasing the number of poles.

Such rings have been made for other applications, such as timing measurements. However, the current invention proposes a very different use for them. Referring again to FIG. 1, the rings 26 are affixed to the shaft 22 and therefore rotate with shaft 22. The rings therefore are rotating with respect to sensor array 28, which is in some manner attached to a non-moving component, such as the housing surrounding the rotating shaft 22.

Sensor array 28 is composed of some number of connected alternating coils 70 and 72. Besides physical orientation, the differences between coils 70 and 72 is the way in which their electrical contacts 74 are wired; the input and output are opposite for coils 70 and 72.

In the preferred embodiment the coils 70 and 72 are designed such that, at the design radius of sensor array 28 from magnetic ring 26, there is exactly one coil corresponding to each pole along the arc or arcs covered by sensor array 28. North poles 50 correspond to one set of coils and south poles 52 to the other. Arbitrarily we will assume that in this case north poles 50 correspond to sensing coils 70 while south poles 52 correspond to sensing coils 72. It should be clear, therefore, that if sensor array 28 offers full coverage of the ring 26 (i.e., a full 360-degree circle around the ring 26), the total number of coils 70 and coils 72, together, corresponds to the total number of north poles 50 and south poles 52.

In any event, if the shaft 22 with its attached rings 26 rotates, the magnetic field associated with poles 50 and 52 moves past/through the coils 70 and 72 associated with sensor array 28. As is well known, the passage of a magnetic field through a conductor causes an electrical current to be generated in the conductor; this is in fact the basic principle on which electrical generators function.

The strength and direction of the electrical current depends on the strength and polarity of the magnetic field; placing multiple coils in series adds to the generated voltage. The magnetic fields of the poles tend to cancel each other at the intersection point of the poles, and rise in strength towards the center of each pole. The resulting electrical currents, therefore, exhibit a sinusoidal waveform. This waveform will have a constant, regularly repeating profile for a given magnetic ring 26 and sensor array 28. As there are two rings 26 and two sensor arrays 28, there are two output waveforms which are similar in profile, and which have in the non-load state (no torque) some particular correspondence to each other. That is, since both have the same cyclic nature, with the same number of poles and coils, they will exhibit some constant phase relationship between the two waveforms.

FIG. 4a shows an example of this relationship. The output waveform from one ring-coil pair, which we will call the base pair, is shown as trace 90, while the waveform from the other ring-coil pair, which we will call the indicator pair, is shown as trace 92. These are shown on a pair of axes; horizontal axis 94 represents passage of time, while vertical axis 96 represents voltage. The two signals 90 and 92 cross the horizontal axis regularly, and are separated in this crossing by a fixed amount, which we call the unloaded offset 98. It should be noted that the unloaded offset 98 may be of any value; trace 90 and 92 could be perfectly co-incident, or offset by 90 degrees in phase or more.

FIG. 4b shows an example of a change which would be seen if the system were then placed under load and developed torque. The base pair trace 90 is unchanged, as it is considered the reference point. The dotted line 100, however, shows the location of the indicator trace 92 from 4a. Trace 102 shows the new signal from the indicator pair. The loaded offset 104—the difference between the intersection of the base and indicator pair traces with the horizontal axis 94—is clearly different from the unloaded offset 98. The difference between unloaded offset 98 and loaded offset 104 represents a change in phase between the base and indicator pair signals of some number of degrees.

By knowing the number of poles (and thus full trace cycles) per ring and this offset difference, we can calculate the actual physical twist that has been imparted to the shaft, as the cause of the change in phase is the relative movement of the two rings; line 30 in FIG. 1 corresponds to the unloaded condition in FIG. 4a, while line 32 corresponds to the loaded condition in FIG. 4b.

For example, if we assume two ring-coil pairs with 40 poles total (and thus 20 full cycles) and a detected offset difference between base and indicator signals of 3 degrees, we can calculate the actual twist. There are 20 cycles per revolution, meaning that from the point of view of our measurements there are 20*360 degrees per full revolution trace. The signal offset, however, is measured as the offset between individual cycles. The actual physical twist offset, therefore, is equal to the offset difference divided by the number of cycles per revolution, or 3/20=0.15 degrees of twist.

By knowing the physical performance of the shaft itself, this twist can be directly translated into the torque experienced by the shaft. For example, if we know that a torque of 45,000 inch-pounds would produce a twist of 1.5 degrees on the shaft in question, we know that the torque experienced in the above case must be 4,500 inch-pounds, as the relationship between torque and twist is linear.

One embodiment of the invention would be to instrument the main drive shaft or shafts of a rotorcraft. Operators of rotorcraft have two very important reasons to want to monitor the torque on these shafts accurately. In the first place, the current methodologies are known to be inaccurate to a few percent, making it impossible to safely operate the craft over about 94% of its rated full power. As rotorcraft use roughly 70% of their power to remain aloft, the remaining 6% of absolute power rating represents an actual difference of 20% in maneuver power and lifting capability, as—at maximum—only 30% of the rotorcraft's power would be available for these tasks. Providing instantaneous accurate feedback on torque permits the pilot to know exactly how much of their rated power is still available, and—when needed—to push the performance envelope as far as it may safely go.

The second application for torque measurement is to monitor the usage of the main shaft and, indirectly, other components of the rotorcraft. Current maintenance is based on a schedule which demands the replacement of components after set periods of time; this means that most components are heavily overdesigned (to ensure that even when used very roughly they will survive until their scheduled replacement time), and that, of necessity, most such components are therefore discarded long before their actual useful life is reached (as most are not used to full capacity throughout their service lifetimes). Providing accurate, reliable, constant data on the actual use profile of the component/s permits condition-based predictive maintenance, which has been demonstrated to save huge amounts of time and money.

A practical consideration for this invention is the method of application of the magnetic rings. While it is possible in many instances that a shaft would be designed such that such a ring could be slid onto it from one end or another during installation or maintenance, there are other cases in which this is not true. If we consider the ends of the shaft 22 in FIG. 1 to be non-removable, it follows that the magnetic rings must be applied either during initial manufacture—which may be difficult or impossible depending on the manufacturing processes (for example, most magnetic materials will lose some or all of their magnetic properties when heated past particular points, and many manufacturing processes may exceed those points)—or following assembly. In the latter case, the ring would of necessity have to be either flexible and split in some fashion—for example, in a manner similar to that of many keychain segments, or be composed of two or more assembled components that together make a complete magnetic ring. The problem with bending many forms of magnetic material is that the stress of bending the material, if it is normally rigid, may affect the magnetic characteristics (even if, mechanically, the material appears to be unaffected).

However, a common method of making such magnetic rings involves the use of a flexible plastic-like material which is magnetized as a straight strip, and then bent into a circle which is then sealed into a metal or other rigid casing. For this invention's application, the flexible magnetized material could be placed around the shaft 22, and locked down by a two-part rigid casing, thus eliminating the risk of affecting the magnetic properties.

As seen in FIG. 5, such a design would of necessity include a seam 120 where the two parts of the magnetic strip met. This seam 120 would—in all likelihood—produce a detectable discontinuity of the magnetic field. This discontinuity could be used for calibration purposes, however, and would not necessarily be a disadvantage.

Examples of other Embodiments

The use of this invention is not limited to only severe environments or only where component movement precludes use of existing technologies. This method is applicable to any rotational element where there is a desire to determine strain of that element. Use to measure linear or rotational movement is possible but the greatest value lies in the rotary applications. Following are some examples of other embodiments.

In one alternate embodiment, more than one ring-coil pair is present at each end of a shaft 22. One reason to have more than one would be if the flexible magnetic rings discussed earlier are used. By having two rings 26 on each end, each offset slightly from the other by some offset distance 122, one ensures that all portions of the rotation of the shaft have at least one ring-pair on each end with a non-discontinuous signal; that is, the seam 120 discontinuity in each ring is "covered for" by the other ring. This ensures that there are no physical "blind spots" in the measurement; depending on the width of the seams, it would be possible for a "transient"—a very short period in which torque "spiked" to very high levels—to be undetected if it occurred at the moment the seam was passing the sensors. As very high stresses contribute very disproportionately to the fatigue damage seen in many components, missing such signals is very much to be avoided. This configuration also provides considerable data redundancy.

Another alternative embodiment would involve a shaft 22 which itself was made of a suitable material for magnetization. In this embodiment, no separate rings 26 would be necessary; instead, the shaft itself could be magnetized in the appropriate location with an appropriate number of poles. In some cases this might be a much more efficient design.

In another alternative embodiment, the shaft 22 may be stationary and the casing may rotate; for example, an axle with a bearing. In this instance, the placement of the rings and coils would be reversed, with the coils on the interior (unmoving) surface, and the rings on the exterior surface.

Another embodiment is envisioned in which the coils may spin and the magnetic rings be affixed to the stationary components. This is illustrated in FIG. 6, in which fixed magnetic rings 140 surround a rotating shaft assembly 20 which has coil assemblies 142 affixed to the shaft assembly 20 at either end. As the coils which are the sensing component are now on the rotating shaft, and the intention and one major innovation of this invention is to eliminate slip rings and similar mechanisms from use, a method is needed to transfer the data from the shaft-mounted coils. This may be accomplished by the use of wireless sensor technology in the form of wireless sensor nodes or bands 144. These nodes 144 may comprise a number of components including but not limited to sensor interfaces, wireless transceivers, filters, microcontrollers, and so on. In this way, the nodes 144 may also perform the functions of electronics 36 as seen in FIG. 1. In any event, the nodes 144 provide some wireless means (radio, near-field magnetics, acoustics, etc.) of transferring the data to some data-processing system 38 as previously described. The nodes 144 may be battery powered, or may incorporate some method of power harvesting or recharge. One obvious harvesting option may be derived from the fact that the combination of magnetic rings 140 and coils 142 also comprise a generator, and some amount of the signal generated by the coils may be scavenged for use by the nodes 144, providing only that sufficient signal is retained to permit accurate measurement of phase.

Additional embodiments would use a varying number and/or geometry of coils and the method of interconnection, including but not limited to: in clusters or groupings, multiple layers of coils, connected in parallel or series or combinations there of, placement at specific angular locations, distributed equally or non-equally in the full circumference or in a narrow region(s). One embodiment of this approach would use uniformly distributed coils, spaced to radially align with the magnetic pole intervals of the magnetic rings around the full circumference on the shaft. By summing the coils together, signal strength is increased and variability due to movement is incorporated into the data that may be processed to determine shaft torsional twist between the two instrumented points on the shaft, providing electrical means to negate signal effects attributable to non-concentric motion while allowing phase measurement of the actual torsional movement. Other methods involve using an algorithm factoring the relative signal strength of opposing coil pick ups to calculate shaft non-concentric location generating a correction factor to net out non-torsional position or phase shift.

CONCLUDING NOTE

The foregoing description of various embodiments of this invention has been presented for purposes of illustration and description. It is not intended to be exhaustive or to limit the invention to the precise form disclosed and inherently many more modifications and variations are possible. All such modifications and variations that may be apparent to persons skilled in the art that are exposed to the concepts described herein or in the actual work product, are intended to be included within the scope of this invention disclosure.

What is claimed is:
1. A system for measuring torque on a rotating component, the method comprising:

At least two signal-producing components which are magnet rings comprising at least one North and one South magnetic pole along the circumference of said magnet ring applied to the rotating component with some separating distance between the magnet rings and affixed in a manner which prevents the magnet rings from moving with respect to each other due to the movement of the rotating component;

A means for obtaining a signal from the magnetic field emanating from the magnet rings, said means affixed to a non-rotating structure partially or wholly surrounding the rotating component;

A means for determining torque from the signals obtained from the magnet rings, comprising hardware or software means of comparing the waveforms created by the magnet rings' movement and thereby determining a twist in the rotating component based on the comparison of the waveforms.

2. The system of claim 1, in which the means for obtaining signals comprises one or more sensing coils for each magnet ring, separated from the rings.

3. The system of claim 2, in which said sensing coils are spaced such that a number of sensing coils may be placed around the rotating component, the number of possible sensing coils being equal to the total number of magnetic poles on the magnet rings.

4. The system of claim 3, further comprising hardware or software means for amplifying the signal from said sensing coils as the magnet ring rotates on the rotating component.

5. The system of claim 4, further comprising hardware or software means for filtering or removing noise.

6. The system of claim 5, further comprising hardware or software means of determining torque on the rotating component from the twist.

7. The system of claim 6, further comprising means of storing and retrieving measurements of torque and other data obtained by the system of claim 6 during operation.

8. The system of claim 7, further comprising a means of determining rotating component remaining lifetime based on the stored torque history.

9. The system of claim 8, further comprising means of estimating other component lifetimes based on transmitted torque estimates.

10. The system of claim 7, further comprising a means for transmitting a torque measurement from the torque measurement system to another separate system such as a data-processing system which performs storage, retrieval, and/or analysis of the torque data for various purposes.

11. The system of claim 1, where the rotating component is a driveshaft.

12. The system of claim 1, where the rotating component is a bearing or sleeve around a stationary shaft and the signal obtaining components may be either inside or outside the bearing or sleeve.

13. The system of claim 1, where the magnet rings are installed on the non-rotating structure partially or wholly surrounding the rotating component and the means for obtaining a signal from the magnet rings are applied to the rotating component with some separating distance between individual instances of the means for obtaining signals from the magnetic rings.

14. The system of claim 13, further comprising a set of electronics for acquiring and wirelessly transferring the data from the means for obtaining signals to another system exterior to the sensing system.

15. The system of claim 14, further comprising a set of components for harvesting power from the environment.

16. The system of claim 15, where the power to be harvested is generated by the action of the invention through the interaction of the signal-producing components with the means for obtaining signals.

17. A method of determining torque comprising:

Removably or permanently applying at least two magnet rings to an existing rotating component, said magnet rings separated by some distance and said magnet rings being permanent magnets of at least one North and one South magnetic pole about the ring's circumference;

Removably or permanently installing sensing coils corresponding to each installed magnet ring on a non-rotating structure such that the sensing coils are at an appropriate distance from the magnet rings;

Obtaining a waveform generated by a magnet ring on a rotating component rotating past sensing coils Obtaining at least one other such waveform generated by another magnet ring on the same rotating component, said other ring separated from the first by some linear distance along the rotating component Comparing the relative phases of these two (or more) waveforms to determine the twist of the rotating component relative to a known non-torque relative phase difference Calculating the torque based on a known relationship between torque and twist of the rotating component.

18. A method of determining torque comprising:

Removably or permanently applying at least two sensing coils to an existing rotating component, said sensing coils separated by some distance;

Removably or permanently installing magnet rings corresponding to each installed magnet ring on a non-rotating structure such that the magnet rings are at an appropriate distance from the sensing coils, and said magnet rings being permanent magnets of at least one North and one South magnetic pole about the ring's circumference;

Obtaining a waveform generated by sensing coils on a rotating component rotating past a fixed magnet ring Obtaining at least one other such waveform generated by another set of sensing coils on the same rotating component paired with another fixed magnet ring, said other ring and coil pair or pairs separated from the first by some linear distance along the rotating component Comparing the relative phases of these two (or more) waveforms to determine the twist of the rotating component relative to a known non-torque relative phase difference Calculating the torque based on a known relationship between torque and twist of the rotating component.

* * * * *